US011015513B1

(12) United States Patent
Kadoi et al.

(10) Patent No.: US 11,015,513 B1
(45) Date of Patent: May 25, 2021

(54) COOLING DEVICE

(71) Applicant: SANOH INDUSTRIAL CO., LTD., Tokyo (JP)

(72) Inventors: Shun Kadoi, Koga (JP); Yoshiaki Agui, Koga (JP); Masatoshi Hada, Nagoya (JP); Nobuteru Hane, Nagoya (JP); Satoru Kumagai, Nagoya (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 17/263,358

(22) PCT Filed: Jun. 26, 2019

(86) PCT No.: PCT/JP2019/025467
§ 371 (c)(1),
(2) Date: Jan. 26, 2021

(87) PCT Pub. No.: WO2020/021950
PCT Pub. Date: Jan. 30, 2020

(30) Foreign Application Priority Data

Jul. 27, 2018 (JP) .............................. JP2018-141689

(51) Int. Cl.
F01P 3/20 (2006.01)
F28F 13/06 (2006.01)
(Continued)

(52) U.S. Cl.
CPC .................. F01P 3/20 (2013.01); F01D 1/06 (2013.01); F01P 11/0276 (2013.01);
(Continued)

(58) Field of Classification Search
CPC .......... F01P 3/20; F01P 11/14; F01P 11/0276; F01P 2060/12; F01D 1/06; F01D 1/02; F28F 13/06
(Continued)

(56) References Cited

U.S. PATENT DOCUMENTS 2,201,314 A * 5/1940 Illsley ........................ F01P 3/20
123/41.15
2,556,327 A * 6/1951 Hild .......................... F01P 3/20
123/41.45
(Continued)

FOREIGN PATENT DOCUMENTS

JP S50-009639 U 1/1975
JP 58-025618 U 2/1983
(Continued)

OTHER PUBLICATIONS

International Patent Application No. PCT/JP2019/025467, International Search Report, dated Aug. 20, 2019.
(Continued)

Primary Examiner — Ljiljana V. Ciric
(74) Attorney, Agent, or Firm — Marshall, Gerstein & Borun LLP

(57) ABSTRACT

A cooling device uses siphon circulation whose heat source is an object-to-be-cooled installed in a vehicle to circulate refrigerant to the object-to-be-cooled, the cooling device including: a tank that is disposed above the object-to-be-cooled and stores the refrigerant; an outflow path that opens to the inside of the tank and through which the refrigerant flows out; a passage member that extends from the inside to the outside of the tank, with an open end of an inside section of the passage member positioned inside the tank being positioned above an opening of the outflow path; and identifying means that is provided at an outside section of the passage member positioned outside the tank and by which the position of the open end inside the tank can be identified.

7 Claims, 8 Drawing Sheets

(51) Int. Cl.
*F01P 11/02* (2006.01)
*F01P 11/14* (2006.01)
*F01D 1/06* (2006.01)
*F01D 1/02* (2006.01)
*F28D 1/06* (2006.01)

(52) U.S. Cl.
CPC ............... *F01P 11/14* (2013.01); *F28F 13/06* (2013.01); *F01D 1/02* (2013.01); *F01P 2060/12* (2013.01); *F28D 1/06* (2013.01)

(58) Field of Classification Search
USPC .......................................................... 62/131
See application file for complete search history.

(56) References Cited

U.S. PATENT DOCUMENTS

| | | | | |
|---|---|---|---|---|
| 3,983,756 A * | 10/1976 | Danguillier | ............... | G12B 9/00 73/866.5 |
| 4,096,754 A * | 6/1978 | Beveridge, Jr. | ..... | G01L 19/0007 137/317 |
| 4,177,676 A * | 12/1979 | Welker | ..................... | G01F 1/10 73/198 |
| 4,831,886 A * | 5/1989 | Eberhardt | ................. | F01P 3/20 73/861.71 |
| 4,836,445 A * | 6/1989 | Okada | ..................... | F23N 1/022 237/2 A |
| 4,958,600 A * | 9/1990 | Janthur | .................... | F01P 3/20 123/41.31 |
| 5,174,325 A * | 12/1992 | Okel | ...................... | G01K 1/146 137/317 |
| 5,186,050 A * | 2/1993 | Lagace | ............... | B63B 17/0018 73/187 |
| 5,199,308 A * | 4/1993 | Lawhon | ................ | G01F 11/284 324/450 |
| 5,275,133 A * | 1/1994 | Sasaki | ...................... | F01P 3/20 123/41.31 |
| 5,353,757 A * | 10/1994 | Susa | .................... | F28D 1/0443 123/41.29 |
| 5,465,586 A * | 11/1995 | Sjoholm | ................... | F01P 3/20 184/104.3 |
| 5,477,695 A * | 12/1995 | Sjoholm | ................... | F01P 3/20 184/104.3 |
| 5,724,830 A * | 3/1998 | Otis | ........................ | F25B 41/00 165/109.1 |
| 6,408,705 B1 * | 6/2002 | Thermos | ................ | F01D 17/02 73/866.5 |
| 9,458,759 B2 * | 10/2016 | Rollinger | ............ | F16H 57/0412 |
| 10,145,830 B2 * | 12/2018 | Fenton | ................... | G01K 13/00 |
| 10,613,066 B2 * | 4/2020 | Fenton | ..................... | G01L 7/00 |
| 10,690,643 B2 * | 6/2020 | Fenton | ................... | G01K 13/00 |
| 2004/0021449 A1 * | 2/2004 | Stenestam | ............ | G01R 31/333 323/255 |
| 2017/0328264 A1 * | 11/2017 | Demonie | ............... | A01D 41/12 |

FOREIGN PATENT DOCUMENTS

| | | |
|---|---|---|
| JP | S61-135929 A | 6/1986 |
| JP | H0205433 U | 4/1990 |
| JP | H06-81643 A | 3/1994 |
| JP | H11141336 A | 5/1999 |

OTHER PUBLICATIONS

Japanese Patent Application No. 2018-141689, Decision to Grant, dated Mar. 10, 2020.

\* cited by examiner

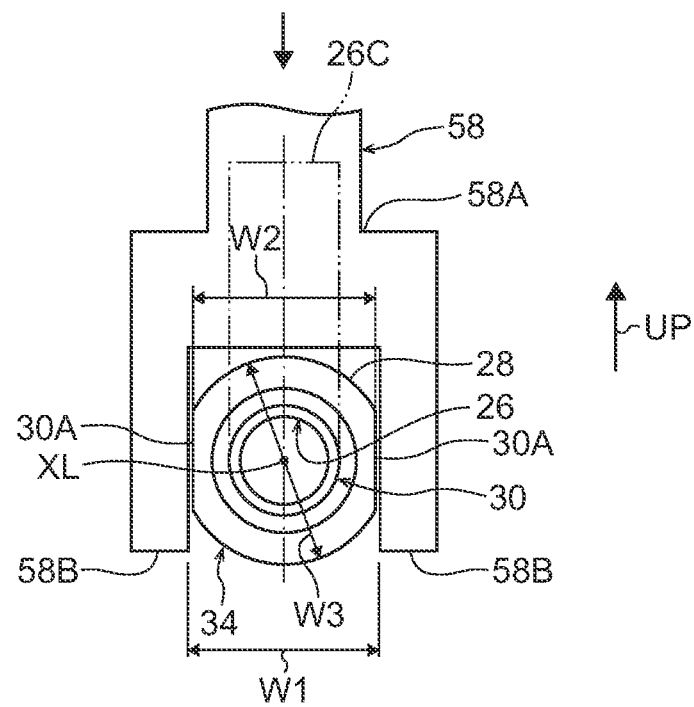
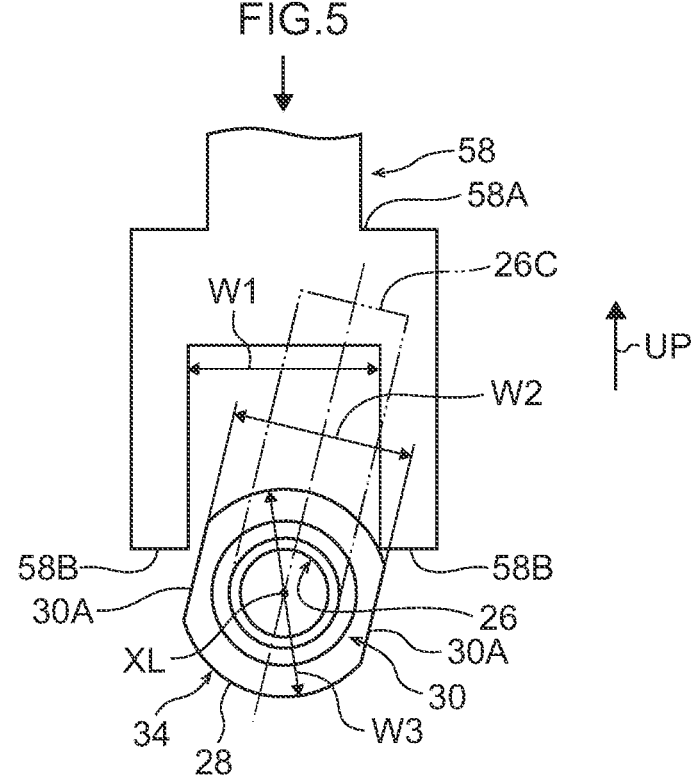

COOLING DEVICE

TECHNICAL FIELD

This disclosure relates to a cooling device for cooling an object-to-be-cooled installed in a vehicle.

BACKGROUND ART

Japanese Patent Application Laid-open No. S61-135929 discloses a technology where a coolant storage tank connected to the downstream side of a supercharger cooling passage is installed in a higher place than the supercharger, a thermosiphon is utilized to circulate the coolant, and cooling of the supercharger is continued powerlessly even after the engine stops.

SUMMARY OF INVENTION

Technical Problem

In Japanese Patent Application Laid-open No. S61-135929, a pipe is inserted, through a bottom wall of the coolant storage tank, into the tank. After assembling the coolant storage tank and the pipe, the inside of the tank is unviewable, so the position of the open end of the pipe inside the tank cannot be checked.

In consideration of the above circumstances, it is a problem of this disclosure to provide a cooling device in which, in a configuration where a passage member extends from the inside to the outside of a tank, the position of an open end of the passage member inside the tank can be checked even when the inside of the tank is unviewable.

Solution to Problem

A cooling device of one aspect of this disclosure is a cooling device that uses siphon circulation, whose heat source is an object-to-be-cooled installed in a vehicle, to circulate refrigerant to the object-to-be-cooled, the cooling device including: a tank that is disposed above the object-to-be-cooled and stores the refrigerant; an outflow path that opens to an inside of the tank and through which the refrigerant flows out; a passage member that extends from the inside to an outside of the tank, with an open end of an inside section of the passage member positioned inside the tank being positioned above an opening of the outflow path; and identifying means that is provided at an outside section of the passage member positioned outside the tank and by which a position of the open end inside the tank can be identified.

Advantageous Effects of Invention

As described above, according to this disclosure, there can be provided a cooling device in which, in a configuration where a passage member extends from the inside to the outside of a tank, the position of an open end of the passage member inside the tank can be checked even when the inside of the tank is unviewable.

BRIEF DESCRIPTION OF DRAWINGS

FIG. 4 is a front view of an inspected portion showing a state in which the result of inspecting the direction of the passage member with an inspection jig of the inspection device shown in FIG. 1 is good.

FIG. 5 is a front view of the inspected portion showing a state in which the result of inspecting the direction of the passage member with the inspection jig of the inspection device shown in FIG. 1 is not good.

DESCRIPTION OF EMBODIMENTS

Figure 1:
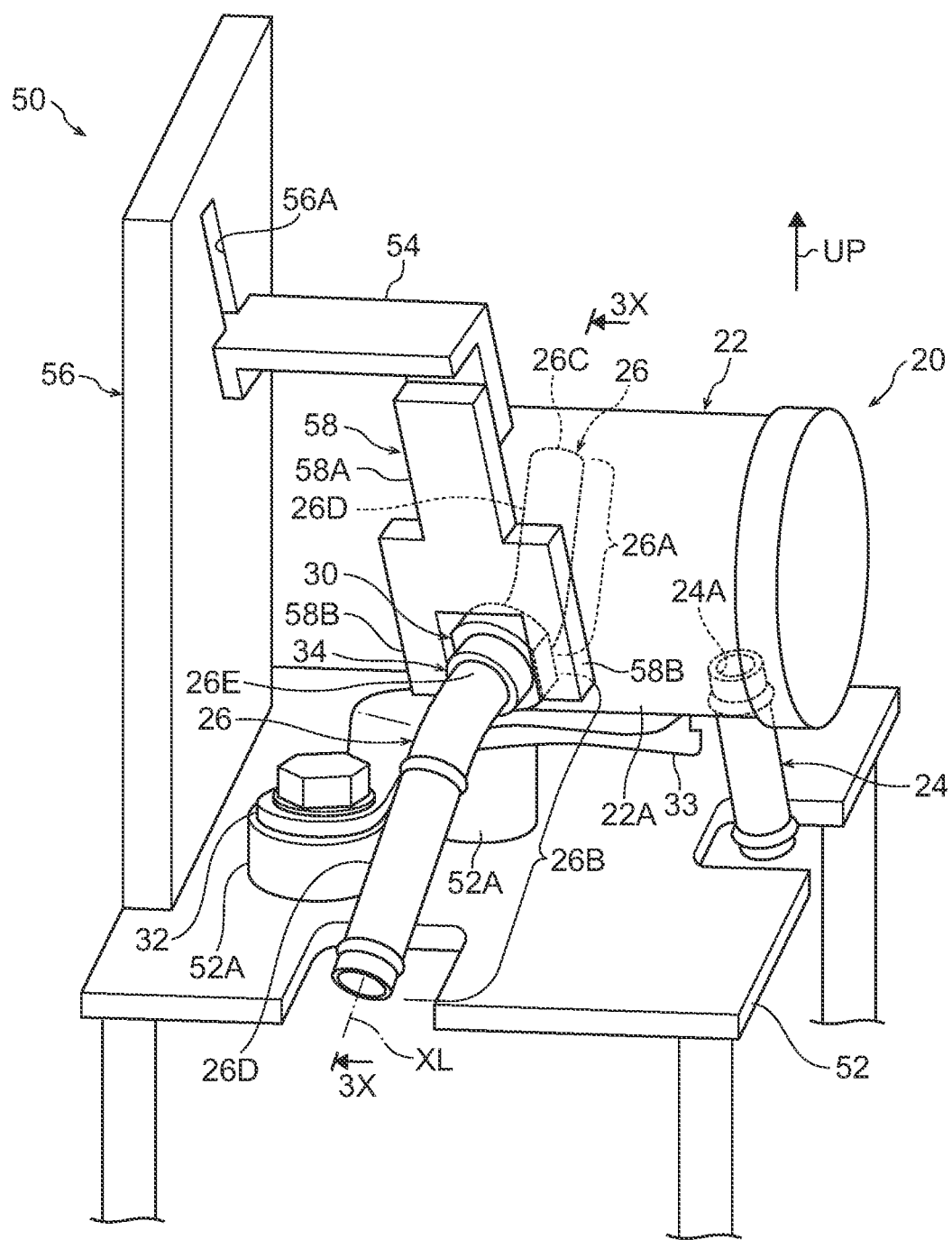
FIG. 1 is a perspective view showing a state in which a cooling device of an embodiment of this disclosure is set in an inspection device.

A cooling device of an embodiment pertaining to this disclosure will be described below with reference to the drawings. It will be noted that arrow UP appropriately shown in the drawings indicates an upward direction in the direction of gravity. Furthermore, when "above" is used below, it refers to an upper side in the direction of gravity.

A cooling device 20 of this embodiment is a device that uses siphon circulation whose heat source is an object-to-be-cooled 100 installed in a vehicle (see FIG. 6) to circulate refrigerant to the object-to-be-cooled 100.

Examples of the object-to-be-cooled 100 include turbochargers, exhaust gas recirculation coolers (EGR coolers), rotating electric machines such as electric motors, generators, and motor generators applied to EVs and HVs, range extenders applied to EVs, and internal combustion engines. Namely, an object whose residual heat after the vehicle stops can become a heat source for siphon circulation can serve as the object-to-be-cooled 100. It will be noted that the object-to-be-cooled 100 of this embodiment is a turbocharger.

Figure 6:
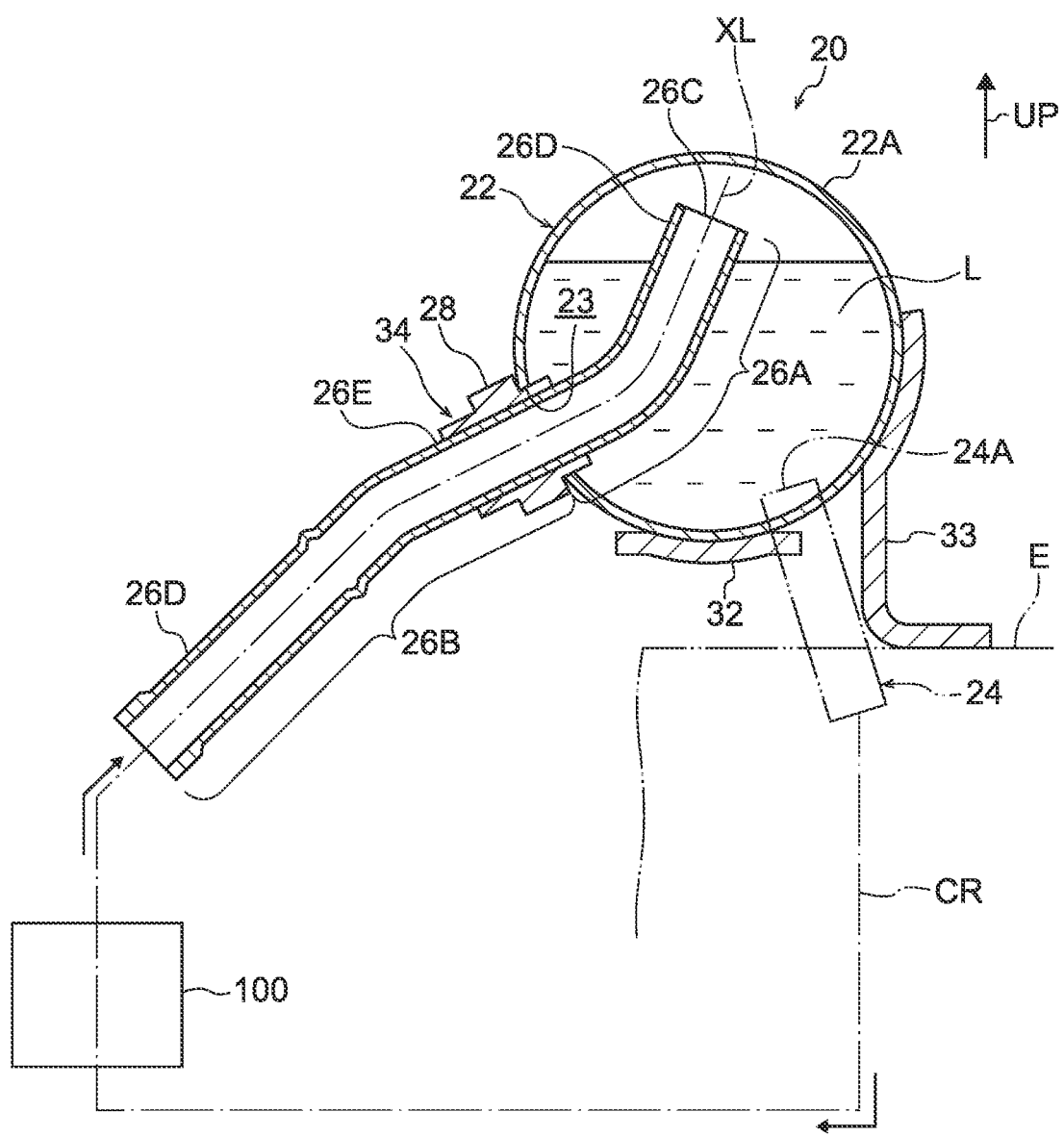
FIG. 6 is a sectional view (a sectional view corresponding to FIG. 3) showing a state in which the cooling device of the embodiment of this disclosure is disposed above an object-to-be-cooled.

As shown in FIG. 1 and FIG. 6, the cooling device 20 has a tank 22, an outflow path 24, a passage member 26, and a sleeve-like component 34.

(Tank)

The tank 22 is cylindrical in shape with closed ends. The tank 22 is disposed lying on its side above the object-to-be-cooled 100. It will be noted that "the tank 22 is disposed lying on its side" here means that the axial direction of the tank 22 coincides with a direction substantially orthogonal to the direction of gravity (on its side). Furthermore, refrigerant L is stored inside the tank 22.

Furthermore, brackets 32, 33 are attached to the lower portion of the tank 22. The brackets 32, 33 are hardware for attaching the tank 22 to the object-to-be-cooled 100. In each of these brackets 32, 33, attachment holes (not shown in the drawings) for attaching the brackets with screws to the object-to-be-cooled 100 are formed. Furthermore, the brackets 32, 33 are also used when installing the tank 22 on an inspection device 50 described later and serve as references for positioning the tank 22.

It will be noted that because the tank 22 of this embodiment is cylindrical in shape, an outer wall 22a of the tank 22 is formed in a cylindrical surface shape, which is one example of a curved surface shape.

(Outflow Path)

Figure 3:
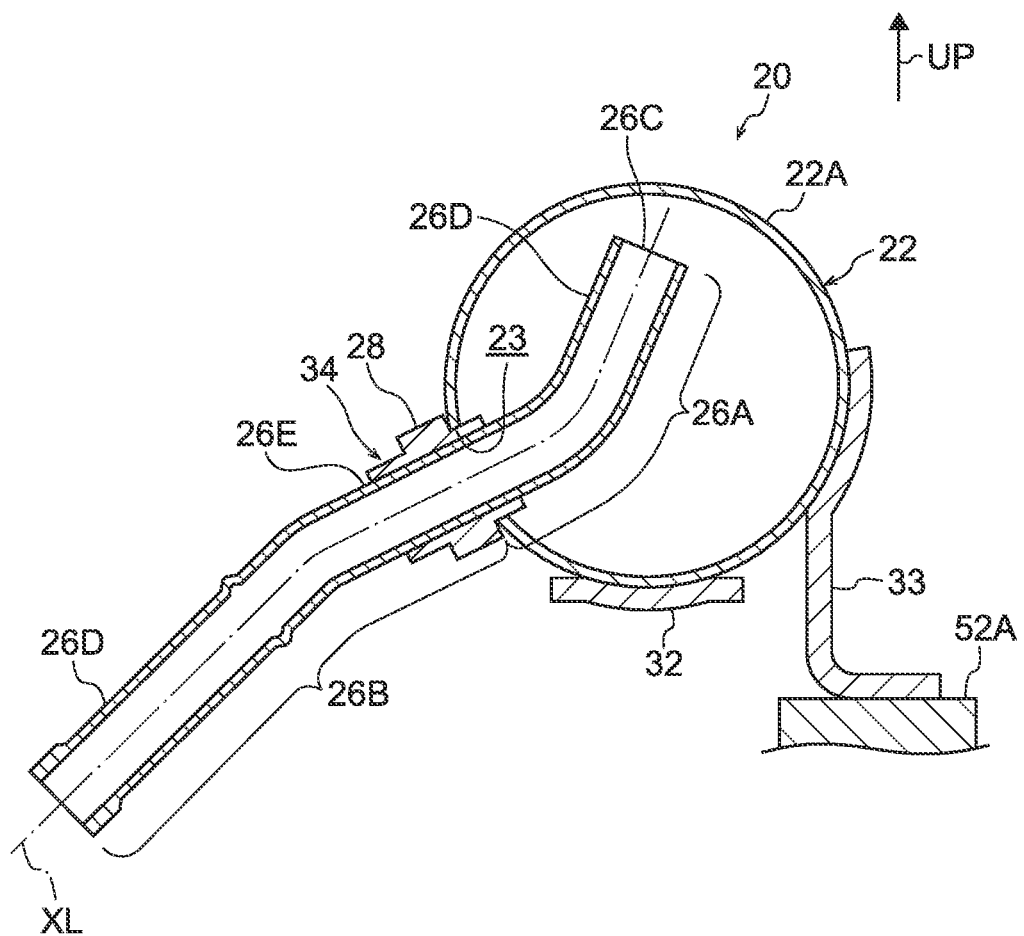
FIG. 3 is a sectional view taken along line 3X-3X of FIG. 1.

As shown in FIG. 1 and FIG. 3, the outflow path 24 opens to an inside of the tank 22 and is a flow path is for the refrigerant L inside the tank 22 to flow out to an outside of the tank 22. The outflow path 24 is provided in the lower portion of the tank 22 and is configured by a pipe that extends from the inside to the outside of the tank 22

(Passage Member)

As shown in FIG. 1 and FIG. 3, the passage member 26 is formed in a tubular shape and configures an inflow path through which the refrigerant L flows into the tank 22. It will be noted that the inflow path configured by the outflow path 24 and the passage member 26 configures part of a circulation route CR (see FIG. 6) of the refrigerant L of the cooling device 20. The object-to-be-cooled 100 is disposed on this circulation route CR.

The passage member 26, as shown in FIG. 3, extends from the inside to the outside of the tank 22.

Furthermore, an open end 26C of an inside section 26A of the passage member 26 positioned inside the tank 22 is positioned above an opening 24A of the outflow path 24. Specifically, the passage member 26 extends diagonally upward and passes through the outer wall 22A, formed in the curved surface shape, of the tank 22. It will be noted that, in this embodiment, because the passage member 26 is inserted into the tank 22 through a through hole 23 formed in the outer wall 22A, the inside section 26A and a later-described outside section 26B of the passage member 26 may also be referred to as an inserted section and a non-inserted section, respectively.

Figure 2:
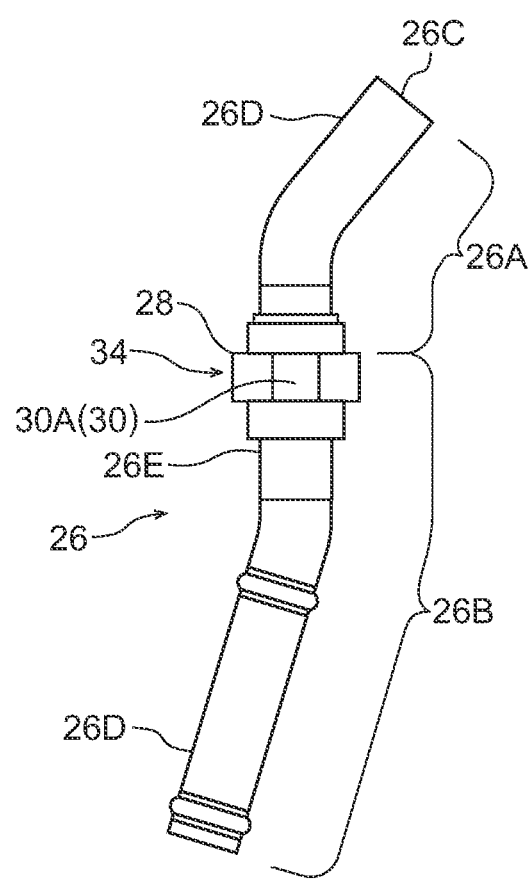
FIG. 2 is a side view showing a passage member of the cooling device of FIG. 1.

As shown in FIG. 2, the passage member 26 has a shape in which both ends of the pipe are bent in mutually opposite directions, and a linear section 26E located between bent portions 26D on both sides of the passage member 26 passes through the through hole 23. The section of the linear section 26E of the passage member 26 positioned inside the tank 22 including the through hole 23 configures part of the inside section 26A, and the section of the linear section 26E of the passage member 26 positioned outside the tank 22 excluding the through hole 23 configures part of the outside section 26B. It will be noted that in this embodiment the bent portion 26D included in the inside section 26A of the passage member 26 is bent with respect to the linear section 26E included in the outside section 26B. That is, the inside section 26A of the passage member 26 is bent with respect to the outside section 26B. Specifically, the bent portion 26D included in the inside section 26A of the passage member 26 is bent upward with respect to the linear section 26E included in the outside section 26B.

(Sleeve-Like Component)

The sleeve-like component 34, which is cylindrical in shape, is attached to the linear section 26E of the passage member 26. Specifically, the sleeve-like component 34 is joined (in this embodiment, brazed) to an outer periphery of the outside section 26B, in the linear section 26E, positioned outside the tank 22.

On the sleeve-like component 34, a flange portion 28 that bulges outward in the radial direction from the outer periphery of the sleeve-like component 34 is formed. The axis of the sleeve-like component 34 and an axis XL of the passage member 26 in the linear section 26E thereof coincide with each other, and the radial direction of the sleeve-like component 34 and a direction orthogonal to the axis XL in the linear section 26E point in the same direction. That is, in this embodiment, the outside section 26B includes the flange portion 28 that bulges in a direction orthogonal to the axis XL.

Furthermore, the flange portion 28 is formed in the shape of an annular disc and is in contact with the outer wall 22A of the tank 22. Specifically, because the outer wall 22A is formed in a curved surface shape, the flange portion 28 is in contact with the peripheral edge portion of the through hole 23. It will be noted that in the gap between the outer wall 22A and the flange portion 28, a brazing pool in which melted brazing material pools during brazing is formed.

As shown in FIG. 4, a width-across-flats portion 30 is formed on the flange portion 28 of the sleeve-like component 34. The width-across-flats portion 30 is an example of a direction checking portion by which a rotational position of the outside section 26B about the axis XL can be checked.

The width-across-flats portion 30 has a pair of flat surfaces 30A that oppose and are parallel to each other. That is, the width-across-flats portion 30 is formed by linearly cutting off opposing portions of the outer periphery of the flange portion 28.

In the cooling device 20 of this embodiment, the tank 22, the pipe configuring the outflow path 24, the passage member 26, the bracket 32, the bracket 33, and the sleeve-like component 34 are configured by a metal material, and these members are joined to each other by brazing. It will be noted that stainless steel, for example, may be used as the metal material.

Next, a process of manufacturing the cooling device 20 will be described.

First, the tank 22 configuring the cooling device 20, the pipe configuring the outflow path 24, the passage member 26, the bracket 32, the bracket 33, and the sleeve-like component 34 are prepared.

Next, the sleeve-like component 34 is temporarily assembled to the passage member 26, and the passage member 26 is passed through the outer wall 22A of the tank 22. Specifically, the passage member 26 is inserted into the tank 22 through the through hole 23 in the outer wall 22A. After the passage member 26 has been inserted until the flange portion 28 comes into contact with the outer wall 22A, the passage member 26 is temporarily assembled to the tank 22. Furthermore, the pipe configuring the outflow path 24 is temporarily assembled in a state in which it is passed through the outer wall 22A of the tank 22. Next, the brackets 32, 33 are temporarily assembled to the lower portion of the tank 22. It will be noted that the temporary assembling of the above constituent members configuring the cooling device 20 is performed in a state in which the constituent members are temporarily secured with dedicated jigs.

Next, the cooling device 20 in the temporarily assembled state is disposed in a heating furnace, and the above constituent members are brazed and fixed to each other. In the way described above the cooling device 20 is manufactured.

Next, an inspection device 50 that inspects the cooling device 20 after manufacture will be described.

As shown in FIG. 1, the inspection device 50 includes an inspection table 52, an arm 54, a support wall 56, and an inspection jig 58.

The inspection table 52 is a table for anchoring the tank 22 lying on its side. On the inspection table 52, anchoring portion 52A for anchoring the brackets 32, 33 with screws are formed.

One end of the arm 54 is slidably supported by the support wall 56, and the other end of the arm 54 is connected to the inspection jig 58.

The support wall 56 is erected on the inspection table 52. A slide groove 56A is formed in the support wall 56, and the one end of the arm 54 inserted into the slide groove 56A is supported so as to be slidable along the slide groove 56A. It will be noted that the support wall 56 is provided with a drive source not shown in the drawings for sliding the arm 54 along the slide groove 56A. It will be noted that examples of the drive source include electric motors and fluid pressure cylinders (hydraulic cylinders, air cylinders, etc.).

The inspection jig 58 includes a base portion 58A that is connected to the other end of the arm 54 and a pair of projecting portions 58B that are tabular and project from the base portion 58A. Specifically, the pair of projecting portions 58B are disposed opposing each other, and a distance W1 between them is equal to or greater than a width W2 of the width-across-flats portion 30 and less than an outer diameter W3 of the flange portion 28.

Next, an inspection process by which the cooling device 20 after manufacture is inspected by the inspection device 50 will be described.

First, as shown in FIG. 1, the brackets 32, 33 are anchored, with the tank 22 lying on its side, to the inspection table 52.

Next, the arm 54 is slid together with the inspection jig 58 toward the width-across-flats portion 30 of the flange portion 28 provided at the outside section 26B of the passage member 26. Because the width W2 of the width-across-flats portion 30 is equal to or less than the distance W1 of the inspection jig 58, when the flat surfaces 30A configuring the width-across-flats portion 30 are not inclined with respect to reference planes of the flange portion 28 along the sliding direction, the width-across-flats portion 30 fits between the pair of projecting portions 58B as shown in FIG. 4. However, when the flat surfaces 30A configuring the width-across-flats portion 30 are inclined with respect to the reference planes, the width-across-flats portion 30 is unable to fit between the pair of projecting portions 58B as shown in FIG. 5, and the fact that the passage member 26 is rotated can be checked. In the way described above, the rotational position of the outside section 26B of the passage member 26 about the axis XL can be checked after brazing.

Next, the action and effects of the cooling device of this embodiment will be described.

As shown in FIG. 6, the cooling device 20 is installed above an engine E. When the engine E is driven, the refrigerant L inside the tank 22 described later is pushed out by a pump not shown in the drawings, circulates through the circulation route CR, and cools the object-to-be-cooled 100 on the circulation route CR. When the engine E is stopped, the pump is also stopped, but when the refrigerant L boiled by the heat of the object-to-be-cooled 100 accumulates inside the tank 22, the refrigerant L inside the tank 22 is discharged by the pressure inside the tank 22 and gravity from the outflow path 24 described later because of the siphon principle. When the refrigerant L is discharged because of the siphon principle, the pressure inside the tank 22 becomes negative and the refrigerant L is sucked up into the tank 22 via the passage member 26 described later. Then, when the refrigerant L boiled by the heat of the object-to-be-cooled 100 accumulates inside the tank 22, the refrigerant L inside the tank 22 is discharged. This series of operations is repeated. It will be noted that when the temperature of the object-to-be-cooled 100 becomes lower than the boiling point of the refrigerant L, the circulation cycle of the refrigerant L automatically stops.

In the cooling device 20 of this embodiment, the inside section 26A of the passage member 26 is bent with respect to the outside section 26B, and the outside section 26B of the passage member 26 is provided with the width-across-flats portion 30 serving as an example of a direction checking portion by which the rotational position of the outside section 26B about the axis XL can be checked. By checking, with the width-across-flats portion 30, the rotational position of the outside section 26B, an position of the open end 26C of the passage member 26 inside the tank 22 can be identified. Furthermore, the width-across-flats portion 30 is provided at the outside section 26B positioned outside the tank 22, that is, the width-across-flats portion 30 is exposed on the outside of the tank 22. For this reason, according to the cooling device 20, the position of the open end 26C of the passage member 26 inside the tank 22 can be checked even when the inside of the tank 22 is unviewable.

In the cooling device 20, the rotational position of the outside section 26B of the passage member 26 can be checked by the width-across-flats portion 30 having the pair of flat surfaces that oppose and are parallel to each other. That is, according to the cooling device 20, the position of the open end 26C of the passage member 26 inside the tank 22 can be accurately grasped with a simple configuration.

Furthermore, in the cooling device 20, when brazing the tank 22 and the sleeve-like component 34 attached to the passage member 26, a brazing pool is formed between the flange portion 28 and the outer wall 22A, so the passage member 26 and the tank 22 are strongly joined (brazed) to each other via the flange portion 28.

Furthermore, because the width-across-flats portion 30 is formed on the flange portion 28, the number of parts is few and an increase in the brazed places can be inhibited compared to a configuration where, for example, the width-across-flats portion is formed on another part that becomes attached to the passage member 26.

In the cooling device 20, the outer wall 22A of the tank 22 has a cylindrical surface shape, so it is easy to increase the brazing pool between the outer wall 22A and the flange portion 28. Because of this, the joint strength between the passage member 26 and the tank 22 can be improved.

Furthermore, in order to increase the height of the open end of the passage member with respect to the opening of the outflow path inside the tank, inserting the passage member through the bottom wall of the tank is advantageous from the standpoint of utilizing the siphon principle. Many conventional technologies also adopt this configuration. However, in such cases, the height of the tank installed above the object-to-be-cooled ends up increasing. For example, in a case where the place where the object-to-be-cooled is installed is in the front compartment of an automobile, an increase in the height of the tank is disadvantageous from the standpoint of protecting pedestrians by securing space between structures such as the engine and the engine hood. Thus, the present inventors developed a configuration where a tank that is cylindrical in shape is laid on its side and an annular passage member is inserted into the cylindrical surface thereof. Because of this, there was no longer an excess in the height direction of the tank, the need arose to enhance the positional accuracy of the open end of the passage member, and a technology by which the position of the open end can be identified was developed.

In the cooling device 20, because the tank 22 that is cylindrical in shape is disposed lying on its side above the object-to-be-cooled 100, a wide space can be secured above the tank in the vehicle compared to a configuration where, for example, the tank is disposed standing upright above the object-to-be-cooled 100.

Moreover, in the cooling device 20, because the passage member 26 extends diagonally upward and passes through the outer wall 22A of the tank 22, the height of the tank 22 can be lowered compared to a configuration where, for example, the passage member 26 extends upward and passes through the bottom wall of the tank 22. Because of this, a wide space can be secured above the tank in the vehicle.

In the above embodiment, the width-across-flats portion 30 is formed on the flange portion 28 of the sleeve-like component 34, but the disclosure is not limited to this configuration. The flange portion 28 and the width-across-flats portion 30 may also be provided separately.

Furthermore, in the above embodiment, the width-across-flats portion 30 is used as an example of the direction checking portion, but the disclosure is not limited to this configuration. For example, one flat surface may also be formed on the flange portion 28. As long as that flat surface has a certain amount of area, whether or not the rotational position of the outside section 26B is in a prescribed state can be inspected by inserting a fork-shaped jig similar to the inspection jig 58 described above over the portion where the flat surface is formed.

Figure 7:
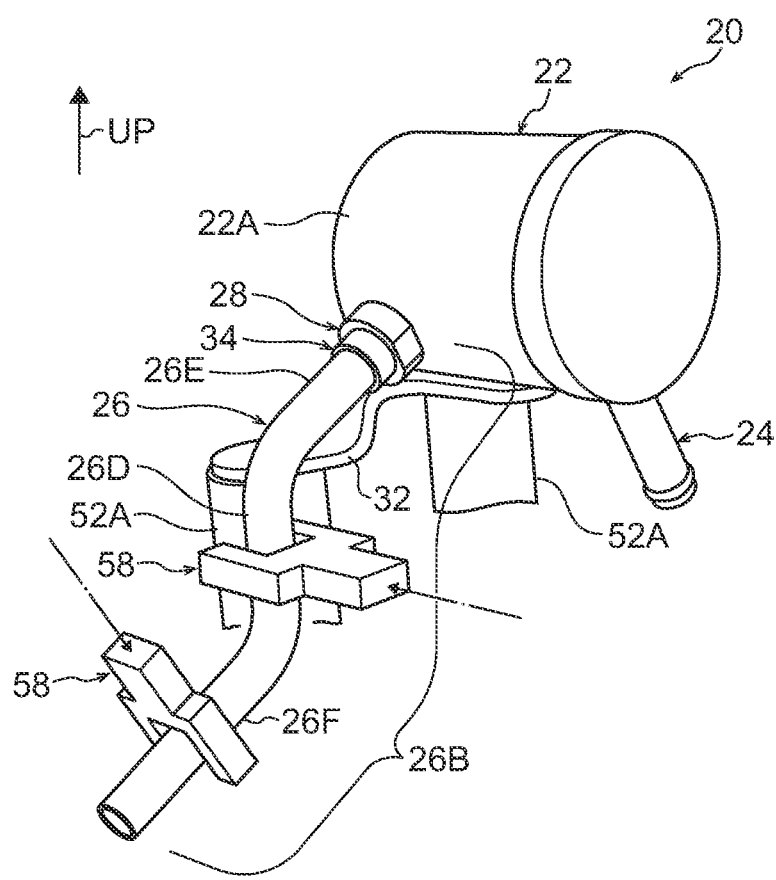
FIG. 7 is a sectional view (a sectional view corresponding to FIG. 3) showing a state in which the cooling device of another embodiment of this disclosure is set in another inspection device.

Moreover, in the above embodiment, the inclination of the flat surfaces 30A of the width-across-flats portion 30 is checked with the inspection jig 58 of the inspection device 50, but the disclosure is not limited to this configuration. For example, as shown in FIG. 7, the bent portion 26D of the outside section 26B of the passage member 26 may be turned up, and the rotational position of the outside section 26B about the axis XL may be checked at the bent portion 26D and a turn-up portion 26F. The outside section 26B curves between the bent portion 26D and the turn-up portion 26F, so that curved section functions as an example of the direction checking portion.

Figure 8:
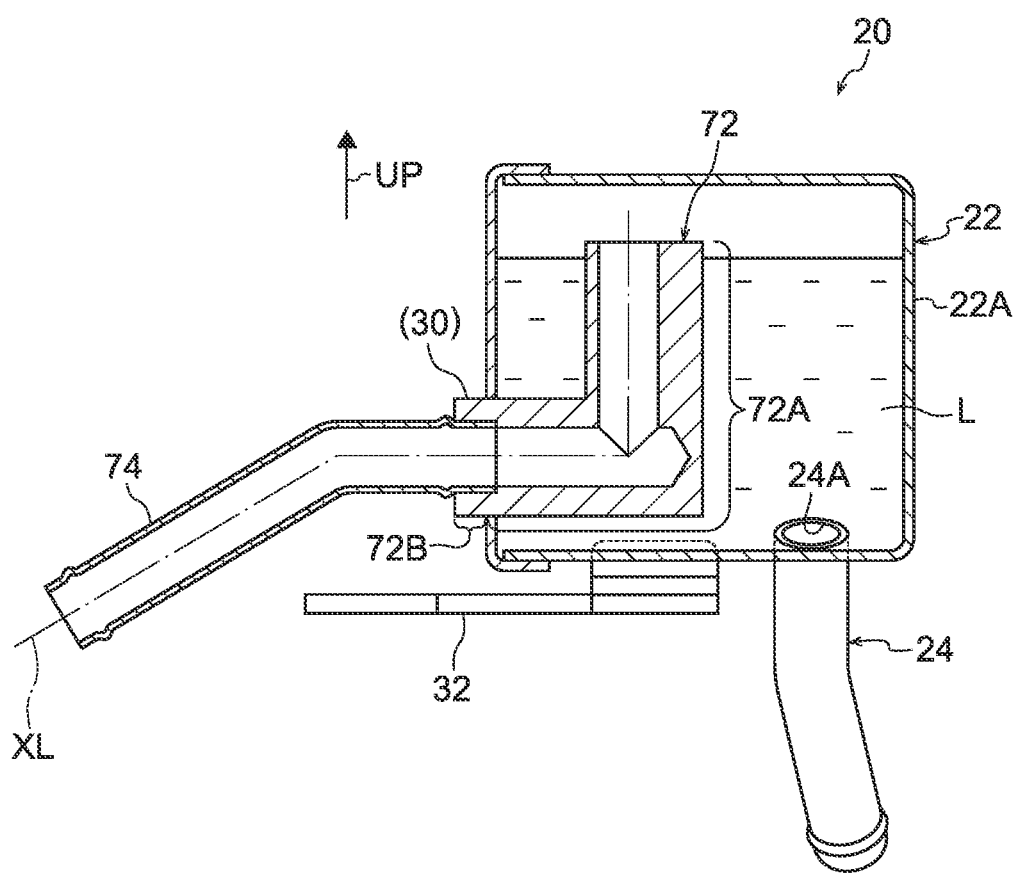
FIG. 8 is a sectional view (a sectional view corresponding to FIG. 3) showing a state in which the cooling device of another embodiment of this disclosure is set in the inspection device.

Further still, in the above embodiment, the passage member 26 configured by one pipe is provided as the pipe connected to the tank 22, but the disclosure is not limited by the shape of the passage member 26. For example, as shown in FIG. 8, an elbow-shaped passage member 72 joined to the tank 22 and a connecting pipe 74 connected to the passage member 72 may also be provided as the pipe connected to the tank 22. Both end portions of the passage member 72 are configured as parts that are cylindrical in shape. The passage member 72 is manufactured by cutting both end portions of an L-shaped metal material into columnar shapes and then boring the metal material in mutually orthogonal directions from both ends processed in the columnar shapes to form a passage. The passage member 72 includes an inside section 72A that is disposed inside in the tank 22 and an outside section 72B that is cylindrical in shape, passes through the outer wall 22A of the tank 22, and extends from the inside section 72A to the outer side of the tank 22. A width-across-flats portion 30 similar to the configuration described above is formed on the outside section 72B that is cylindrical in shape. It will be noted that the connecting pipe 74 is connected to the passage member 72 by being inserted into the inner periphery of the outside section 72B.

Figure 9:
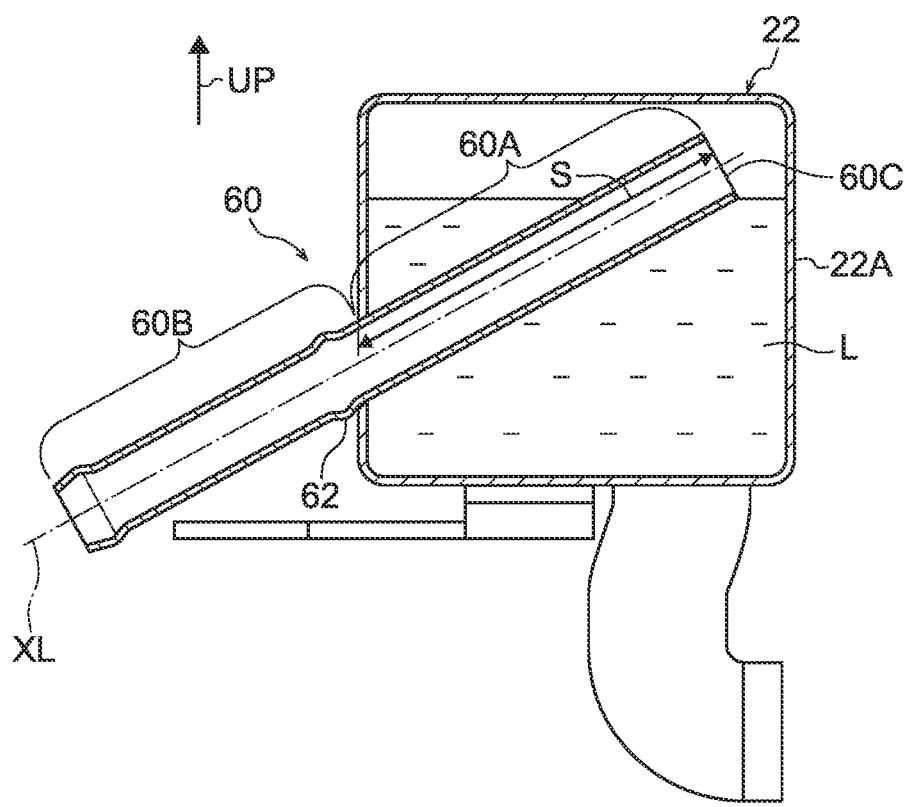
FIG. 9 is a sectional view (a sectional view corresponding to FIG. 3) showing a state in which the cooling device of another embodiment of this disclosure is set in the inspection device.

In the above embodiment, the passage member 26 has a shape in which both ends of the pipe are bent in mutually opposite directions, but the disclosure is not limited to this configuration. For example, as shown in FIG. 9, a configuration where a passage member 60 is linearly extended, that is, a straight pipe, may be used as the passage member 60. An outside section 60B of the passage member 60 is provided with a bulging portion 62 for checking the insertion length into the tank 22 (a length S of an inside section 60A). The bulging portion 62 is an example of a length checking portion that functions as identifying means, and is a spool portion formed by compressing the pipe in its axial direction. In a case where the pipe inserted into the tank 22 is a straight pipe, the position of an open end 60C of the passage member 60 inside the tank 22 can be checked with the bulging portion 62 even when the inside of the tank 22 is unviewable.

Modes of carrying out the disclosure have been described above by way of embodiments, but these embodiments are examples and can be modified and implemented in various ways without departing from the spirit thereof. For example, instead of the width-across-flats portion and the width-along-flat portion described above, a mark such as a punch or paint may be applied to the outside section of the passage member, and the mark can be made to function as an example of the direction checking portion. Furthermore, instead of the bulging portion described above applied to the straight pipe, a protrusion may be provided at the outside section 60B of the passage member 60, and the protrusion can also be made to function as an example of the length checking portion. Moreover, it is also possible to check a length of the inside section 26A by butting the flange portion 28 of the sleeve-like component 34 against the outer wall 22A of the tank 22, so the flange portion 28 can also be made to function as n example of the length checking portion. It goes without saying that the scope of rights of the disclosure is not limited to these embodiments.

In relation to the above embodiments, the following supplementary notes are also disclosed.

(Supplementary Note 1)

A cooling device that uses siphon circulation, whose heat source is an object-to-be-cooled installed in a vehicle, to circulate refrigerant to the object-to-be-cooled, the cooling device comprising:

a tank that is disposed above the object-to-be-cooled and stores the refrigerant;

an outflow path that opens to an inside of the tank and through which the refrigerant flows out;

a passage member that extends from the inside to an outside of the tank, with an open end of an inside section of the passage member positioned inside the tank being positioned above an opening of the outflow path; and identifying means that is provided at an outside section of the passage member positioned outside the tank and by which a position of the open end inside the tank can be identified.

In the cooling device of supplementary note 1, the identifying means is provided at the outside section of the passage member positioned outside the tank, and the position of the open end of the passage member inside the tank can be identified with the identifying means. For this reason, according to this cooling device, the position of the open end of the passage member inside the tank can be checked even when the inside of the tank is unviewable.

(Supplementary Note 2)

The cooling device of supplementary note 1, wherein:

the passage member passes through an outer wall of the tank, and the inside section of the passage member is bent with respect to the outside section, and the identifying means has a direction checking portion by which a rotational position of the outside section about its axis can be checked.

In the cooling device of supplementary note 2, the inside section of the passage member is bent with respect to the outside section, and the outside section of the passage member is provided with the direction checking portion by which the rotational position of the outside section about its axis can be checked. With the passage member whose inside section is bent with respect to its outside section, the position of the open end of the passage member changes inside the tank if the outside section is rotated about its axis with respect to the tank. Namely, if the rotational position of the outside section is determined, the position of the open end of the passage member inside the tank is also determined. According to the cooling device of supplementary note 2, the rotational position of the outside section of the passage member can be checked with the direction checking portion, so the position of the open end of the passage member inside the tank can be accurately grasped from the outside of the tank even when the inside of the tank is unviewable.

(Supplementary Note 3)

The cooling device of supplementary note 2, wherein the direction checking portion is provided at the outside section and is configured by a width-across-flats portion having a pair of flat surfaces that oppose and are parallel to each other.

In the cooling device of supplementary note 3, the rotational position of the outside section of the passage member can be checked with the width-across-flats portion having the pair of flat surfaces that oppose and are parallel to each other. That is, according to the cooling device of supplementary note 3, the position of the open end of the passage member inside the tank can be accurately grasped with the direction checking portion that has a simple configuration.

(Supplementary Note 4)

The cooling device of supplementary note 2, wherein the direction checking portion is configured as a result of the outside section curving.

In the cooling device of supplementary note 4, the rotational position of the outside section about its axis can be checked by positioning the outside section at two points on either side of the curved section. That is, according to the cooling device of supplementary note 4, the position of the open end of the passage member inside the tank can be accurately grasped with the direction checking portion that has a simple configuration in which the outside section is curved.

(Supplementary Note 5)

The cooling device of supplementary note 1, wherein: the passage member extends linearly and passes through an outer wall of the tank, and the identifying means has a length checking portion by which a length of the inside section along its axis can be checked.

In the cooling device of supplementary note 5, the passage member extends linearly and passes through the outer wall of the tank, and the outside section of the passage member is provided with the length checking portion by which the length of the inside section along its axis can be checked. The position of the open end of the passage member inside the tank can be accurately grasped by checking, with the length checking portion, the length of the inside section along its axis.

(Supplementary Note 6)

The cooling device of supplementary note 5, wherein the length checking portion is configured by a bulging portion that bulges from the outside section in a direction orthogonal to the axis and contacts the outer wall of the tank.

In the cooling device of supplementary note 6, the length checking portion is configured by the bulging portion that contacts the outer wall of the tank, so the precision of the insertion length of the passage member can be improved, for example, by inserting the passage member into the tank until the bulging portion comes into contact with the outer wall of the tank.

(Supplementary Note 7)

The cooling device of supplementary note 3, further comprising a sleeve-like component that is joined to an outer periphery of the outside section of the passage member and contacts the outer wall of the tank, wherein the width-across-flats portion is provided at the sleeve-like component.

In the cooling device of supplementary note 7, in the case of brazing the tank and the passage member, a brazing pool is formed between the sleeve-like component and the tank outer wall, so the passage member and the tank are strongly joined (brazed) to each other via the sleeve-like component.

(Supplementary Note 8)

The cooling device of supplementary note 7, wherein the outer wall of the tank is formed in a curved surface shape.

In the cooling device of supplementary note 8, in the case of joining the sleeve-like component to the tank outer wall by brazing in a state in which it is in contact with the tank outer wall, it is easy to increase the brazing pool between the tank outer wall and the sleeve-like component when the outer wall of the tank has a curved surface shape. Consequently, there is an advantage to applying the sleeve-like component in a case where the outer wall of the tank has a curved surface shape. Because of this, the joint strength between the passage member and the tank can be improved.

(Supplementary Note 9)

The cooling device of any one of supplementary notes 1 to 8, wherein the passage member extends diagonally upward and passes through an outer wall of the tank.

In the cooling device of supplementary note 9, the passage member extends diagonally upward and passes through the tank outer wall, so the height of the tank can be lowered compared to a configuration where, for example, the passage member extends upward and passes through the tank bottom wall. Because of this, a wide space can be secured above the tank in the vehicle.

(Supplementary Note 10)

The cooling device of supplementary note 9, wherein the tank is cylindrical in shape with closed ends and is disposed lying on its side above the object-to-be-cooled.

In the cooling device of supplementary note 10, the tank that is cylindrical in shape with closed ends is disposed lying on its side above the object-to-be-cooled, so a wide space can be secured above the tank in the vehicle compared to a configuration where, for example, the tank that is cylindrical in shape is disposed standing upright above the object-to-be-cooled.

It will be noted that the disclosure of Japanese Patent Application No. 2018-141689, filed on Jul. 27, 2018, is incorporated in its entirety herein by reference.

All documents, patent applications, and technical standards mentioned in this specification are incorporated herein by reference to the same extent as if each individual document, patent application, or technical standard were specifically and individually indicated to be incorporated by reference.

The invention claimed is:

1. A cooling device that uses siphon circulation, whose heat source is an object-to-be-cooled installed in a vehicle, to circulate refrigerant to the object-to-be-cooled, the cooling device comprising:

a tank that is disposed above the object-to-be-cooled and stores the refrigerant;

an outflow path that opens to an inside of the tank and through which the refrigerant flows out;

a passage member that extends from the inside to an outside of the tank, with an open end of an inside section of the passage member positioned inside the tank being positioned above an opening of the outflow path; and identifying means that is provided at an outside section of the passage member positioned outside the tank and by which a position of the open end inside the tank can be identified, wherein:

the passage member passes through an outer wall of the tank, and the inside section of the passage member is bent with respect to the outside section, and the identifying means has a direction checking portion by which a rotational position of the outside section about its axis can be checked.

2. The cooling device of claim 1, wherein the direction checking portion is provided at the outside section and is configured by a width-along-flat portion having one flat surface or a width-across-flats portion having a pair of flat surfaces that oppose and are parallel to each other.

3. The cooling device of claim 2, further comprising a sleeve-like component that is joined to an outer periphery of the outside section of the passage member and contacts the outer wall of the tank, wherein the width-along-flat portion or the width-across-flats portion is provided at the sleeve-like component.

4. The cooling device of claim 3, wherein the outer wall of the tank is formed in a curved surface shape.

5. The cooling device of claim 1, wherein the direction checking portion is configured as a result of the outside section curving.

6. The cooling device of claim 1, wherein the passage member extends diagonally upward and passes through an outer wall of the tank.

7. The cooling device of claim 6, wherein the tank is cylindrical in shape with closed ends and is disposed lying on its side above the object-to-be-cooled.

* * * * *